A. W. DELANE.
ELASTIC WHEEL.
APPLICATION FILED MAY 12, 1913.
1,131,775.
Patented Mar. 16, 1915.
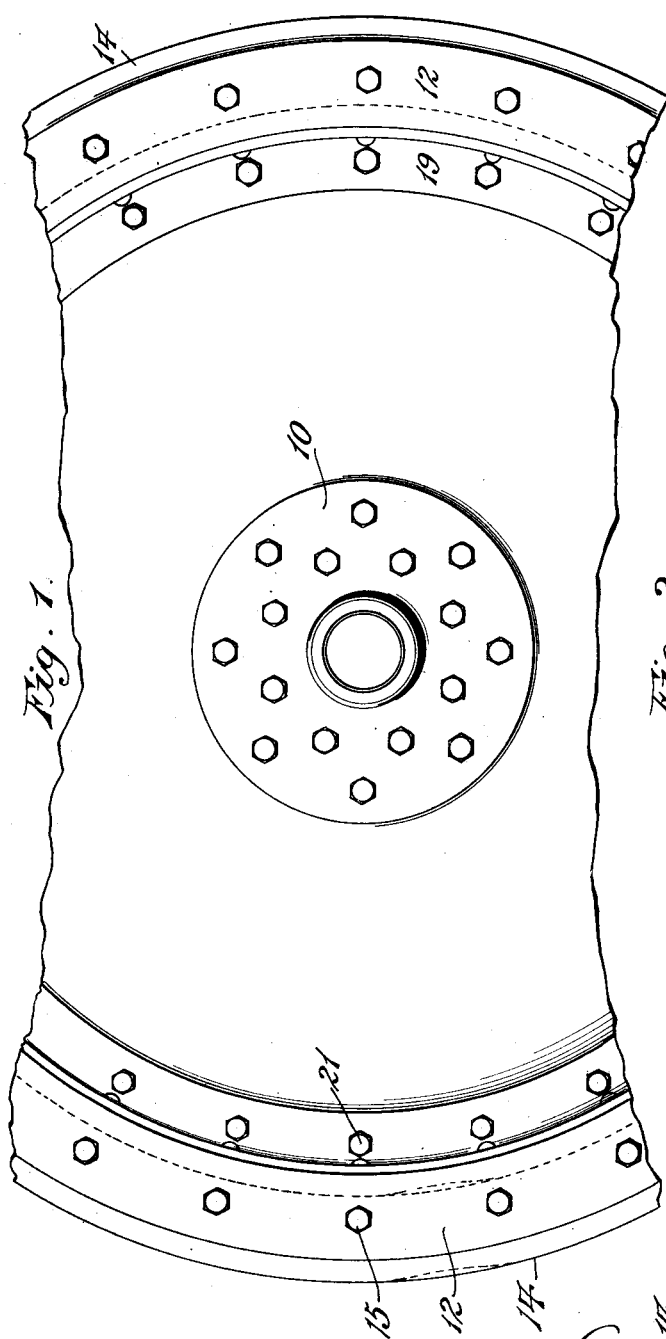
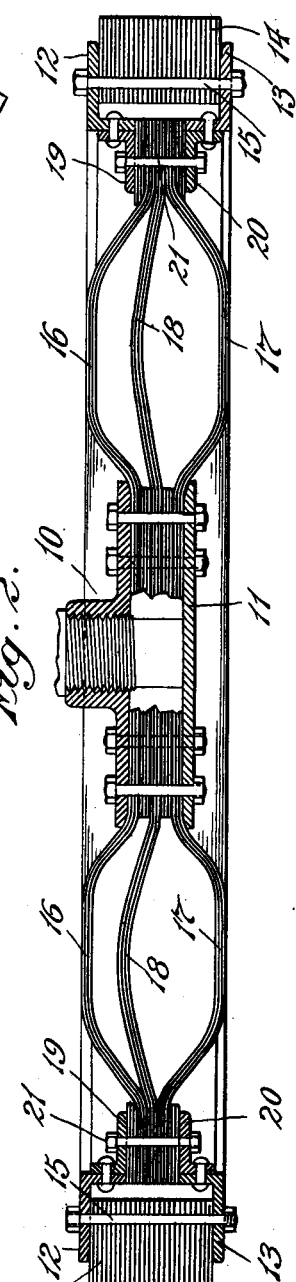

UNITED STATES PATENT OFFICE.

ANSON W. DELANE, OF NEW YORK, N. Y., ASSIGNOR OF ONE-HALF TO NICHOLAS W. RYAN, OF NEW YORK, N. Y.

ELASTIC WHEEL.

1,131,775.  Specification of Letters Patent.  Patented Mar. 16, 1915.

Application filed May 12, 1913. Serial No. 767,233.

*To all whom it may concern:*

Be it known that I, ANSON W. DELANE, a citizen of the United States, residing at New York, in the county of Bronx and State of New York, have invented certain new and useful Improvements in Elastic Wheels; and I do hereby declare the following to be a full, clear, and exact description of the invention, such as will enable others skilled in the art to which it appertains to make and use the same.

This invention has relation to a cheap, durable and effective form of resilient wheel suitable for use in automobiles or other vehicles where it is desirable to intercept the shocks incident to travel.

A preferred form of carrying out the invention is illustrated in the accompanying drawings, wherein—

Figure 1 is a face view of a portion of the wheel and Fig. 2 is a median section through the same.

The wheel hub is built up of two compression plates, 10 and 11, the former of which may be screwed, or otherwise fastened, on the axle, as shown. The felly is made of two annular angle plates, preferably of mild steel, between which is clamped a softer tread 14, by means of bolts 15 at suitable intervals.

Between the hub and felly I insert a resilient pneumatic wheel-body composed of two suitably shaped annular pieces 16 and 17, preferably made up in layers of fabric such as used in automobile tires. The innermost layer may be made of thin inflatable rubber of a well known nature.

The annular sheets 16 and 17 are secured by being bolted as shown between the hub plates 10 and 11 on one side and being similarly bolted and compressed between annular angle pieces 19 and 20 secured to the angle pieces 12 and 13 respectively and compressed together upon the fabric by means of bolts 21 at suitable intervals.

The inflation of the chamber inclosed between the sheets 16 and 17 may be accomplished in any well known manner which requires no description here.

I prefer to employ additional thicknesses of compression pieces preferably in annular form between the compression plates on the hub and felly as shown in Fig. 2.

In the preferred form an additional annular sheet 18 is interposed between the sheets 16 and 17 and is slightly dished as shown in Fig. 2. This has the double effect of adding to the stiffness of the resistance of relative motion between the felly and hub, and on the other hand, dividing the pneumatic space within the wheel body into two parts so that an accidental puncture on one side will not deflate the entire wheel.

The tread 14 is made up of parallel annular layers of relatively soft material which may be of substantially the same nature as the sheets 16 and 17. These annular sheets are clamped, as shown in the drawings, between the angle irons 12 and 13 and they are so proportioned as to leave a space between the bottom of the felly channel formed by the bars 12 and 13 as clearly shown in Fig. 2 and in dotted lines in Fig. 1.

This arrangement permits a certain degree of local yielding of the tread as indicated in dotted lines on the left of Fig. 1. This yielding is often useful in lessening the wear upon the tread due to stones or other obstacles.

Various changes may be made in this device without departing from my invention and I do not limit myself to the details herein shown and described.

What I claim is—

1. A resilient wheel comprising in combination a felly, composed of two annular channel bars having compression plates attached within them, a body portion composed of two annular flexible sheets having their outer circular edges united and fastened between said compression plates, and a hub composed of two compression plates bolted together so as to squeeze the internal circular edges of said annular sheets, substantially as described.

2. A resilient wheel comprising in combination a felly, an annular pneumatic body portion composed of two exterior flexible sheets having their outer edges fixed to said felly, a hub to which the inner edges of said sheets are fixed, and an internal dished annular flexible sheet fixed to said hub and felly and dividing the interior of said body portion into two independent compartments, substantially as described.

In testimony whereof, I affix my signature, in presence of two witnesses.

ANSON W. DELANE.

Witnesses:
KATHARINE C. MEAD,
H. S. MACKAYE.